United States Patent [19]

Moritz et al.

[11] 4,038,268

[45] July 26, 1977

[54] PROCESS FOR PREPARING AZO DYESTUFFS CONTAINING 2,4,6-TRI-AMINO-3-(CYANO ESTER OR CARBONAMIDE)PYRIDINE

[75] Inventors: Karl Ludwig Moritz, Cologne; Karl Heinz Schundehutte, Opladen, both of Germany

[73] Assignee: Bayer Aktiengesellschaft, Leverkusen, Germany

[21] Appl. No.: 496,715

[22] Filed: Aug. 12, 1974

Related U.S. Application Data

[63] Continuation-in-part of Ser. No. 442,621, Feb. 14, 1974, Pat. No. 4,006,128.

[30] Foreign Application Priority Data

Feb. 14, 1973    Germany ............................. 2307168

[51] Int. Cl.² ...................... C09B 29/36; C07D 213/38
[52] U.S. Cl. ................... 260/156; 260/296 R
[58] Field of Search ............................ 260/156, 296 R

[56] References Cited

U.S. PATENT DOCUMENTS

| | | | |
|---|---|---|---|
| 2,068,353 | 1/1937 | Schneiderwirth | 260/156 X |
| 2,857,372 | 10/1958 | Straley et al. | 260/146 |
| 3,080,374 | 3/1963 | Carbon | 260/296 |
| 3,657,214 | 4/1972 | Berrie et al. | 260/156 |
| 3,853,896 | 12/1974 | Pessolano et al. | 260/296 |

FOREIGN PATENT DOCUMENTS

| | | | |
|---|---|---|---|
| 2,263,007 | 7/1973 | Germany | 260/158 |
| 1,901,711 | 4/1970 | Germany | 260/156 |
| 448,085 | 3/1968 | Switzerland | 260/156 |

OTHER PUBLICATIONS

Cossey et al., "Angew. Chem. Internat. Edit", vol. 11, No. 12, pp. 1099 & 1100, (1972).

*Primary Examiner*—Daniel E. Wyman
*Assistant Examiner*—John J. Doll
*Attorney, Agent, or Firm*—Plumley and Tyner

[57] ABSTRACT

Azo dyestuffs free of sulphonic acid groups and carboxylic acid groups are prepared by coupling a diazo compound with a coupler which is prepared by reacting an organic amine with a pyridinium salt having the formula

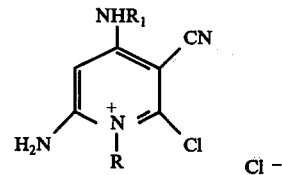

I in which

R is substituted or unsubstituted alkyl, cycloalkyl, aralkyl or aryl; and $R_1$ is substituted or unsubstituted alkyl or aralkyl. The dyestuffs are suitable for dyeing and printing synthetic materials such as polyolefines, polyvinyl compounds, cellulose acetate and triacetate and polyesters to give yellow to blue dyeings and prints with good fastness properties especially to light and sublimation.

11 Claims, No Drawings

PROCESS FOR PREPARING AZO DYESTUFFS CONTAINING 2,4,6-TRI-AMINO-3-(CYANO ESTER OR CARBONAMIDE)PYRIDINE

This application is a continuation-in-part of U.S. application Ser. No. 442,621, filed Feb. 14, 1974, now U.S. Pat. No. 4,006,128.

This invention relates to azo dyestuffs which are free of sulphonic acid groups and carboxylic acid groups. The dyestuffs are prepared by coupling a diazotized amine of the formula $$D-NH_2 \quad (II)$$

with a coupling component (IV) which is obtained by reacting a pyridinium salt of the formula (III) below with at least two equivalents of an organic amine at a temperature of 110° to 130° C and optionally converting the cyano group into an ester or carbonamide group in the known manner.

The reaction of the pyridinium salt (III) with the amines is either carried out in excess amine or in the presence of an inert solvent such as, for example, chloroform, acetonitrile, tetrahydrofurane and others.

The pyridinium salt has the formula (III)

[chemical structure of pyridinium salt with $NHR_1$, $CN$, $H_2N$, $N^+$, $R$, $Cl$, $Cl^-$ substituents]

in which

R is substituted or unsubstituted alkyl, cycloalkyl, aralkyl, or aryl; and $R_1$ is substituted or unsubstituted alkyl or aralkyl.

The pyridinium salts (III) are in part known from Angewandte Chemie 84, 1184 (1972) or obtainable according to the process described there.

The organic amine, for example, can have the formula $$R_3-NH_2$$

in which $R_3$ is substituted or unsubstituted alkyl, aralkyl or aryl, particularly $C_1$-$C_4$-alkyl which can be substituted by hydroxy, methoxy or ethoxy; benzyl or phenylethyl which can be substituted by chlorine, $C_1$-$C_4$-alkyl or $C_1$-$C_4$-alkoxy; phenyl or phenyl substituted by $C_1$-$C_4$-alkyl, $C_1$-$C_4$-alkoxy, halogen or cyano.

Suitable organic amines are primary $C_1$-$C_4$alkylamines, arylamines and phenyl-$C_1$-$C_3$-alkylamines, such as, for example, methylamine, ethylamine, n-propylamine, n-butylamine, β-hydroxyethylamine, aniline, benzylamine, phenylethylamine, γ-hydroxypropylamine γ-ethoxypropylamine, β-methoxyethylamine and γ-methoxypropylamine.

As already indicated, the cyano group in the coupling component can be optionally converted to an ester or a carbonamide group in the known manner.

The carbonamide group can be represented by the formula $$-CON\begin{matrix}Q_1\\Q_2\end{matrix}$$

in which $Q_1$ and $Q_2$ independently of one another are hydrogen, alkyl, cycloalkyl, aralkyl or aryl; or conjointly with the nitrogen atom form a 5-membered or 6-membered heterocyclic structure; for example a morpholine, piperidine or pyrrolidine ring.

The ester group can be represented by the formula $$-COOQ_3$$

in which $Q_3$ is alkyl or aralkyl.

Suitable radicals D in the diazotized amine (II) are aromatic-carbocyclic radicals, especially those of the benzene, diphenyl, naphthalene and anthraquinone series, and aromatic-heterocyclic radicals, preferably those of the thiadiazole, triazole, benztriazole, indole, benzthiazole and oxdiazole series.

Preferred radicals D are radicals of the benzene, thiadiazole and benzthiazole series. These radicals can possess further non-ionic substituents customary in dyestuff chemistry. As examples there may be mentioned: halogen atoms, such as chlorine, bromine and fluorine, alkyl, alkoxy aryl, aryloxy, nitro, cyano, trifluoromethyl, alkylcarbonyl, alkoxycarbonyl, arylcarbonyl, alkylsulphonyl, arylsulphonyl, alkylcarbonylamino, arylcarbonylamino, arylazo, sulphamoyl and carbamoyl radicals; alkyl and alkoxy are preferably to be understood as radicals of this type with 1-4 C atoms and aryl is preferably to be understood as phenyl radicals which are optionally substituted by halogen, $C_1$-$C_4$-alkyl and $C_1$-$C_4$-alkoxy.

The alkyl radicals R, $R_1$, $Q_1$, $Q_2$ and $Q_3$ preferably possess 1-6 C atoms and can be substituted, for example, by halogen, such as F, Cl or Br, or by cyano, hydroxyl, $C_1$-$C_4$-alkoxy or $C_2$-$C_5$-alkoxycarbonyl groups.

Cycloalkyl radicals R, $Q_1$ and $Q_2$ can preferably be cyclohexyl radicals which can be substituted by, for example, methyl radicals.

Suitable aryl radicals R, $Q_1$ and $Q_2$ are above all phenyl radicals which are optionally substituted by $C_1$-$C_4$-alkyl, $C_1$-$C_4$-alkoxy, halogen or cyano; halogen is preferably to be understood as chlorine. The phenyl and tolyl radical are preferred.

Suitable aralkyl radicals R, $R_1$, $Q_1$, $Q_2$ and $Q_3$ are preferably benzyl and phenylethyl radicals which can be substituted by, for example, chlorine, $C_1$-$C_4$-alkyl or $C_1$-$C_4$-alkoxy.

Particularly valuable dyestuffs are obtained by coupling a diazotized amine of having the formula

[chemical structure of benzene ring with Z, $NH_2$, and $(Y)_n$ substituents]

in which

Y is halogen, nitro, cyano, $CF_3$, $C_2$-$C_5$-alkylcarbonylamino, $C_1$-$C_4$-alkylsulphonyl, $C_2$-$C_5$-alkoxycarbonyl, phenyl,

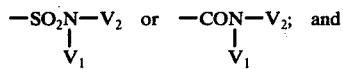

Z is hydrogen, methyl, $C_1$–$C_4$-alkyl, $C_1$–$C_4$-alkoxy, nitrile or halogen;

$V_1$ and $V_2$ independently of one another are hydrogen or $C_1$–$C_4$-alkyl; and n is the number 1 or 2;
with a coupler (IV) prepared as indicated above in which the cyano group is unconverted or is converted to —$CONQ_1Q_2$; and in which R and $R_1$ are $C_1$–$C_6$-alkyl, or $C_1$–$C_6$-alkyl substituted by OH, CN, halogen, $C_1$–$C_4$-alkoxy or $C_2$–$C_5$-alkylcarbonyl; and $Q_1$ and $Q_2$ are hydrogen or $C_1$–$C_4$-alkyl.

The abovementioned $C_1$–$C_4$-alkyl radicals are n-propyl, n-butyl and above all methyl and ethyl radicals. Halogen is preferably to be understood as chlorine and bromine.

Among the $C_2$–$C_5$-alkoxycarbonyl radicals Y which have been mentioned, the methoxycarbonyl and ethoxycarbonyl radicals are to be regarded as particularly suitable. Acetyl is the preferred alkylcarbonyl group.

It has now been discovered that the reaction of an amine having the formula $R_3NH_2$ with a pyridinium salt having the formula

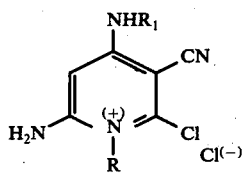

under the conditions described above is

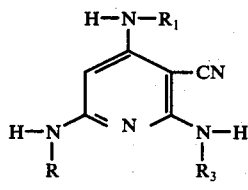

and not

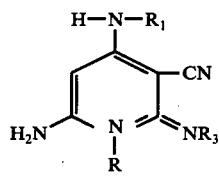

as incorrectly described in our parent application, Ser. No. 442,621.

Accordingly, the dyestuffs of this invention produced by the method described above are found to have the formula

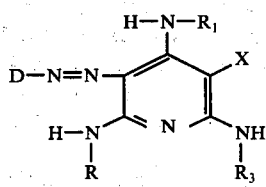

in which

D, R and $R_1$ and $R_3$ all have the meanings given above and

X is cyano, or an ester or carbonamide group as defined above.

The coupling of the diazotized amines (II) with the compounds (IV) is carried out in a manner which is in itself known, in a weakly acid, neutral or weakly alkaline, aqueous or organic-aqueous medium, the addition of an acid-binding agent, such as, for example, sodium acetate, being advisable at times As examples of suitable diazo compounds of the formula (II) there may be mentioned: aniline, 2-, 3- and 4-N,N-dimethylamino-aniline, 2-, 3- and 4-aminotoluene, 3- and 4-amino-benzotrifluoride, 3- and 4-amino-1,2-dimethyl-benzene, 2-, 4- and 5-amino-1,3-dimethylbenzene, 4-amino-1,3,5-trimethylbenzene, 2-, 3- and 4-aminoanisole, 2-, 3- and 4-aminophenetole, 2-amino-1,4-dimethoxybenzene, 2-amino-1,4-diethoxybenzene, 2-, 3- and 4-chloroaniline, 2-, 3- and 4-bromoaniline, 2,3-, 2,4-, 2,5- and 3,4-dichloroaniline, 2,5-dibromoaniline, 2,4,5-, 2,4,6-, 3,4,5- and 3,4,6-trichloroaniline, 3-, 4-, 5- and 6-chloro-2-amino-toluene, 4-chloro-3-amino-toluene, 2-chloro-4-amino-toluene, 5-chloro-2-amino-benzotrifluoride, 4,5- and 4,6-dichloro-2-amino-toluene, 2,5- and 4,6-dichloro-3-amino-toluene, 2,5- and 3,5-dichloro-4-amino-toluene, 4,5,6-trichloro-2-amino-toluene, 4-chloro-2-amino-1,3-dimethylbenzene, 6-chloro-3-amino-anisole, 2-chloro-4-amino-anisole, 3-chloro-4-aminoanisole, 2-, 3- and 4-nitroaniline, 3-nitro-4-amino-toluene, 5-nitro-4-amino-1,3-dimethylbenzene, 6-nitro-3-amino-anisole, 3-nitro-4-amino-anisole, 5-nitro-2-aminophenetole, 2-nitro-4-amino-phenetole, 3-nitro-4-amino-phenetole, 5-nitro-2-amino-1,4-dimethoxy-benzene, 5-nitro-2-amino-1,4-diethoxy-benzene, 2-chloro-4-nitroaniline, 2-bromo-4-nitroaniline, 4-chloro-2-nitroaniline, 4-bromo-2-nitroaniline, 2,6-dichloro-4-nitroaniline, 2-chloro-6-bromo-4-nitroaniline, 2,6-dibromo-4-nitroaniline, 2,4-dinitroaniline, 6-chloro-2,4-dinitroaniline, 6-bromo-2,4-dinitroaniline, 2,4,6-trinitroaniline, 2-, 3- and 4-amino-benzonitrile, 1-amino-2-cyano-5-chlorobenzene, 2-cyano-4-nitroaniline, 4-cyano-3-nitroaniline, 2,5-dichloro-4-aminosulphonylaniline, 4-methylsulphonylaniline, 1-amino-2,4-dicyanobenzene, 1-amino-2,6-dicyano-4-nitrobenzene, 1-amino-2-chloro-4-methyl-sulphonylbenzene, 2-methylsulphonyl-4-nitroaniline, 4-methylsulphonyl-2-nitroaniline, 2-, 3- and 4-amino-benzaldehyde, 2-, 3- and 4-amino-acetophenone, 2-amino-5-nitro-acetophenone, 2-, 3- and 4-amino-benzophenone, 2-, 3- and 4-amino-4'-methyl-benzophenone, 2-, 3- and 4-amino-4'-methoxybenzophenone, 4-amino-5-nitro-benzophenone, 2-, 3- and 4-amino-benzoic acid ethyl ester, 2-, 3- and 4-aminobenzoic acid n-butyl ester, 2-, 3- and 4-amino-benzoic acid cyclohexyl ester, 2-, 3- and 4-amino-benzoic acid amide, 2-, 3- and 4-amino-benzoic acid monomethylamide, 2-, 3- and 4-amino-benzoic acid dimethylamide, 2-, 3- and 4-amino-benzoic acid ethyleneimide, 2-, 3- and 4-amino-benzoic acid isopropylamide, 2-, 3- and 4-amino-benzoic acid diethylamide, 2-, 3- and 4-amino-benzoic acid di-n-butylamide, 2-, 3- and 4-aminobenzoic acid morpholide, 2-, 3- and 4-amino-benzoic acid anilide, 2-, 3- and 4-amino-benzoic acid N-methylanilide, 2-, 3- and 4-amino-phenyl acetic acid ester, 2-, 3- and 4-aminophenyl β-methoxy-propionic acid ester, 2-, 3- and 4-aminophenyl phenylacetic acid ester, 2-, 3- and 4-amino-phenyl phenoxyacetic acid ester, 2-, 3- and 4-amino-phenyl benzoic acid ester, 2-, 3- and 4-aminophenyl methylsulphonic acid ester, 2-, 3- and 4-aminophenyl ethylsulphonic acid ester, 2-, 3- and 4-aminophenyl β-chloroethylsulphonic acid ester, 2-, 3- and 4-amino-phenyl butylsulphonic acid ester, 2-, 3- and 4-amino-phenyl n-hexylsulphonic acid ester, 2-, 3- and 4-amino-phenyl phenylsulphonic acid ester, 2-, 3- and 4-aminophenyl (4'-methyl-phenyl)-sulphonic acid ester, 2-, 3- and 4-amino-phenyl (4'-methoxy-phenyl)-sulphonic acid ester, 2-, 3- and 4-amino-phenyl β-ethoxy-ethylsulphamic acid ester, 2-, 3- and 4-amino-benzenesulphonic acid ethyl ester, 2-, 3- and 4-amino-benzenesulphonic acid phenyl ester, 2-, 3- and 4-amino-phenyl dimethylsulphamic acid ester, 2-, 3- and 4-amino-phenyl ethylsulphamic acid ester, 2-, 3- and -amino-phenyl -aminophenyl diethylsulphamic acid ester, 2-, 3- and 4-aminophenyl di-n-butylsulphamic acid ester, 2-, 3- and 4-amino-phenyl cyclohexylsulphamic acid ester, 2-, 3- and 4-amino-benzenesulphonic acid amide, 2-, 3- and 4-amino-benzenesulphonic acid monomethylamide, 2-, 3- and 4-aminobenzenesulphonic acid dimethylamide, 2-, 3- and 4-amino-benzenesulphonic acid ethyleneimide, 2-, 3- and 4-amino-benzenesulphonic acid diethylamide, 2-, 3- and 4-amino-benzenesulphonic acid di-n-butylamide, 2-, 3- and 4-amino-benzenesulphonic acid morpholide, 2-, 3- and 4-amino-benzenesulphonic acid cyclohexylamide, 2-, 3- and 4-amino-benzenesulphonic acid anilide, 2-, 3- and 4-amino-benzenesulphonic acid N-methyl-anilide, 1-methyl-2-amino-benzene-4-sulphonic acid amide, 1-methoxy-2-amino-benzene-4-sulphonic acid amide, 1-methoxy-2-amino-benzene-4-sulphonic acid N-methylanilide, 1-chloro-2-amino-benzene-4-sulphonic acid dimethylamide, 1-chloro-2-amino-benzene-5-sulphonic acid β-ethoxy-ethylamide, 1-chloro-3-amino-benzene-4-sulphonic acid amide, 1-chloro-4-amino-benzene-2-sulphonic acid dimethylamide, 4-amino-benzene-methylurethane, 2-, 3- and 4-amino-acetanilide, 2-, 3- and 4-amino-phenoxyacetanilide, 2-, 3- and 4-amino-N-methyl-acetanilide, 4-amino-diphenyl, 4-amino-diphenyl-4'-carboxylic acid ethyl ester, 4-amino-4'-acetylamino-diphenyl, 4-amino-2',4'-dinitro-diphenylamine, 4-amino-3-nitro-diphenylamine-4'-sulphonic acid amide, 1-amino-naphthalene, 1-amino-5-ethoxy-naphthalene, 2-chloro-1-amino-naphthalene, 2-amino-naphthalene, 2-amino-naphthalene-6-sulphonic acid dimethylamide, 5-nitro-2-amino-thiazole, 4-amino-azo-benzene, 2',3-dimethyl-4-amino-azo-benzene, 2-methyl-4-amino-5-methoxy-azo-benzene, phenyl-azo-4-aminonaphthalene, 4-methylsulphonylaniline, 2-amino-thiazole, 2-amino-5-nitrothiazole, 2-amino-5-thiocyanatothiazole, 2-aminobenzthiazole, 2-amino-6-methoxybenzthiazole, 2-amino-6-ethoxybenzthiazole, 2-amino-6-chlorobenzthiazole, 2-amino-4,5-dichlorobenzthiazole, 2-amino-5,6-dichlorobenzthiazole, 3-amino-5-nitrobenzisothiazole and 3-phenyl-5-amino-thiadiazole-(1,2,4).

The new dyestuffs are very suitable for dyeing and printing structures of synthetic materials such as, for example, polyolefines, polyvinyl compounds, cellulose 2½-acetate, cellulose triacetate and especially polyester materials, for example polyethylene glycol terephthalate. On these they give, by the customary dyeing and printing processes, yellow to blue dyeings and prints with good fastness properties, especially good fastness to light and sublimation.

The materials mentioned are appropriately dyed from aqueous suspension in the presence of carriers between about 80° C and 110° C, in the absence of carriers between about 110° C and 140° C, or by the thermofixing process at about 170° C and 230° C. Printing can be carried out by steaming the printed goods in the presence of a carrier at temperatures between 80° C and 100° C or in the absence of a carrier at about 110° C to 140° C or treating them by the thermofixing process at about 170° C and 230° C.

In the examples which follow, parts denote parts by weight and percentages denote percentages by weight.

EXAMPLE 1

23.3 parts of 1-methyl-2-chloro-3-cyano-4-methylamino-6-amino-pyridinium chloride (prepared according to the instructions of A. L. Cossey; Angewandte Chemie, 84 (1972) page 1185, and 100 parts of benzylamine are heated to 110°–130° C. for four to six hours. The reaction mixture is subsequently introduced, while still hot, into approximately 500 parts of ice water. The product which precipitates is filtered off, thoroughly washed with water and dried. Approximately 24 parts of the compound of the formula

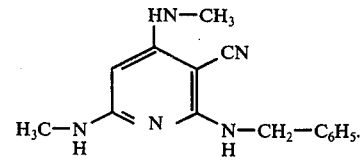

are obtained; the compound melts, after recrystallization from ethanol, at 148°–153° C and contains small quantities of a pyridone impurity, produced by hydrolysis.

The table which follows indicates further dyestuffs according to the present invention and the colour shades of dyeings or prints which are obtainable therewith on polyester materials and which also possess good fastness properties.

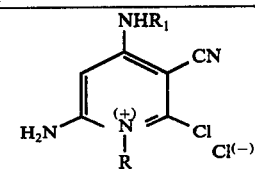

| No. | Diazotized Amine (D—NH$_2$) D | Coupled with the reaction product of an amine (R$_3$NH$_2$) reacted with R$_3$ | R | R$_1$ | Colour shade on polyester |
|---|---|---|---|---|---|
| 2. | 4-Chlorophenyl | —CH$_3$ | CH$_3$ | CH$_3$ | yellow |
| 3. | 2,5-Dichlorophenyl | —CH$_3$ | CH$_3$ | " | yellow |
| 4. | 4-Phenylazophenyl | —C$_2$H$_5$ | CH$_3$ | " | orange |
| 5. | 2,5-Dichlorophenyl | —C$_3$H$_7$ | CH$_3$ | " | yellow |
| 6. | 4-Phenylazophenyl | -n-C$_4$H$_9$ | CH$_3$ | " | orange |
| 7. | 4-Chlorophenyl | —C$_6$H$_5$ | CH$_3$ | " | yellow |
| 8. | 2,5-Dichlorophenyl | " | CH$_3$ | " | yellow |
| 9. | 2-Chloro-4-nitrophenyl | " | CH$_3$ | " | orange |
| 10. | 4-Cyanophenyl | " | CH$_3$ | " | yellow |
| 11. | 4-Carboethoxyphenyl | " | CH$_3$ | " | yellow |
| 12. | 4-Methylphenyl | " | CH$_3$ | " | yellow |
| 13. | 4-Phenylazophenyl | " | CH$_3$ | " | orange |
| 14. | 3-Chlorophenyl | —CH$_2$—C$_6$H$_5$ | CH$_3$ | " | yellow |
| 15. | 4-Chlorophenyl | " | CH$_3$ | " | yellow |
| 16. | 3,5-Dichlorophenyl | " | CH$_3$ | " | yellow |
| 17. | 2,4-Dichlorophenyl | " | CH$_3$ | " | yellow |
| 18. | 3-Methylphenyl | " | CH$_3$ | " | yellow |
| 19. | 4-Methylphenyl | " | CH$_3$ | " | yellow |
| 20. | 3-Trifluoromethylphenyl | " | CH$_3$ | " | yellow |
| 21. | 4-Methoxyphenyl | " | CH$_3$ | " | yellow |
| 22. | 2-Chloro-4-methylphenyl | " | CH$_3$ | " | yellow |
| 23. | 2-Trifluoromethyl-5-chlorophenyl | " | CH$_3$ | " | yellow |
| 24. | 2-Chloro-5-methoxyphenyl | " | CH$_3$ | " | yellow |
| 25. | 2-Chloro-4-nitrophenyl | " | CH$_3$ | " | orange |
| 26. | 2-Cyanophenyl | " | CH$_3$ | " | yellow |
| 27. | 4-Cyanophenyl | " | CH$_3$ | " | yellow |
| 28. | 2-Cyano-5-chlorophenyl | " | CH$_3$ | " | yellow |
| 29. | 2-Cyano-4-nitrophenyl | " | CH$_3$ | " | orange |
| 30. | 2,4-Dicyanophenyl | " | CH$_3$ | " | yellow |
| 31. | 3,4-Dicyanophenyl | " | CH$_3$ | " | yellow |
| 32. | 4-Methylsulphonylphenyl | " | CH$_3$ | " | yellow |
| 33. | 4-Acetylphenyl | " | CH$_3$ | " | yellow |
| 34. | 4-Carboethoxyphenyl | " | CH$_3$ | " | yellow |
| 35. | 4-Acetaminophenyl | " | CH$_3$ | " | yellow |
| 36. | 4-Carbonamidophenyl | " | CH$_3$ | " | yellow |
| 37. | 3-Sulphonamidophenyl | " | CH$_3$ | " | yellow |
| 38. | 4-Sulphonamidophenyl | " | CH$_3$ | " | yellow |
| 39. | 4-Sulphamidoxyphenyl | " | CH$_3$ | " | yellow |
| 40. | 3-Sulphamidoxyphenyl | " | CH$_3$ | " | yellow |
| 41. | 3-N,N-Diethylsulphamidoxyphenyl | " | CH$_3$ | " | yellow |
| 42. | 3-Nitrophenyl | " | CH$_3$ | " | yellow |
| 43. | 2-Nitro-4-cyclohexylphenyl | " | CH$_3$ | " | orange |
| 44. | 4-Phenylaminophenyl | " | CH$_3$ | " | yellow |
| 45. | Naphthyl-1 | " | CH$_3$ | " | yellow |
| 46. | Naphthyl-2 | " | CH$_3$ | " | yellow |
| 47. | 4-Phenylazophenyl | " | CH$_3$ | " | orange |
| 48. | 4-Phenylazonaphthyl-1 | " | CH$_3$ | " | red |
| 49. | 5-Nitro-thiazolyl-2 | " | CH$_3$ | " | red |
| 50. | 6-Chloro-benzthiazolyl-2 | " | CH$_3$ | " | red |
| 51. | 4-Chlorophenyl | " | C$_2$H$_5$ | C$_2$H$_5$ | yellow |
| 52. | 2,5-Dichlorophenyl | " | C$_2$H$_5$ | " | yellow |
| 53. | 4-Phenylazophenyl | " | C$_2$H$_5$ | " | orange |
| 54. | 2,5-Dichlorophenyl | " | C$_6$H$_5$ | C$_6$H$_5$ | yellow |
| 55. | 4-Phenylazophenyl | " | C$_6$H$_5$ | " | orange |
| 56. | 2,5-Dichlorophenyl | " | CH$_3$ | CH$_3$ | yellow |
| 57. | 4-Phenylazophenyl | —⟨C$_6$H$_4$⟩—O—CH$_3$ | CH$_3$ | " | orange |
| 58. | " | " | CH$_3$ | " | orange |
| 59. | " | —⟨C$_6$H$_4$⟩—Cl | CH$_3$ | " | orange |
| 60. | 2,5-Dichlorophenyl | —CH$_2$—CH$_2$—⟨C$_6$H$_4$⟩—Cn | CH$_3$ | " | yellow |
| 61. | 4-Phenylazophenyl | " | CH$_3$ | " | orange |
| 62. | 2,5-Dichlorophenyl | —CH$_2$—CH$_2$—OH | CH$_3$ | " | yellow |
| 63. | 2,5-Dichlorophenyl | —CH$_2$—CH$_2$—O—CH$_3$ | CH$_3$ | " | yellow |
| 64. | " | —CH$_2$—CH$_2$—CN | CH$_3$ | " | yellow |
| 65. | " | —CH$_2$—C$_6$H$_5$ | CH$_3$ | C$_2$H$_5$ | yellow |
| 66. | " | —CH$_2$—C$_6$H$_5$ | C$_2$H$_5$ | CH$_3$ | yellow |
| 67. | 4-Phenylazophenyl | —CH$_2$—C$_6$H$_5$ | C$_2$H$_5$ | " | orange |
| 68. | 2,5-Dichlorophenyl | —C$_6$H$_5$ | C$_2$H$_5$ | CH$_3$ | yellow |
| 69. | " | —C$_6$H$_5$ | C$_6$H$_5$ | C$_6$H$_5$ | yellow |
| 70. | " | —CH$_2$—CH$_2$—O—CH$_3$ | CH$_3$ | C$_6$H$_5$ | yellow |

-continued

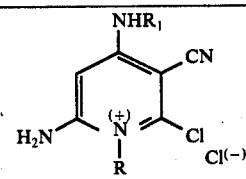

| No. | Diazotized Amine (D—NH₂) D | Coupled with the reaction product of an amine (R₃NH₂) reacted with R₃ | R | R₁ | Colour shade on polyester |
|---|---|---|---|---|---|
| 71. | 4-Phenylazophenyl | " | CH₃ | " | orange |
| 72. | " | —CH₂—C₆H₅ | CH₃ | CH₃ | orange |
| 73. | 2-Chloro-5-trifluoromethylphenyl | —CH₂—C₆H₅ | CH₃ | CH₃ | yellow |
| 74. | 4-Cyclohexyloxycarbonylphenyl | " | CH₃ | " | yellow |
| 75. | 2-Nitrophenyl | " | CH₃ | " | scarlet |
| 76. | 4-Nitrophenyl | " | CH₃ | " | scarlet |
| 77. | 2-Chloro-4-nitrophenyl | " | CH₃ | " | scarlet |
| 78. | 2-Methoxy-4-nitrophenyl | " | CH₃ | " | red |
| 79. | 2-Cyano-4-nitrophenyl | " | CH₃ | " | red |
| 80. | 2-Methylsulphonyl-4-nitrophenyl | " | CH₃ | " | red |
| 81. | 2-Carbomethoxy-4-nitrophenyl | " | CH₃ | " | red |
| 82. | 2,5-Dimethoxy-4-nitrophenyl | " | CH₃ | " | red |
| 83. | Thiazolyl-2 | " | CH₃ | " | orange |
| 84. | 6-Methoxybenzthiazolyl-2 | " | CH₃ | " | scarlet |
| 85. | 5,6-Dichlorobenzthiazolyl-2 | " | CH₃ | " | scarlet |
| 86. | 2-Cyanophenyl | —CH₂—CH₂—OH | CH₃ | " | yellow |
| 87. | " | —CH₂—CH₂—O—CH₃ | CH₃ | " | yellow |
| 88. | " | —CH₂—CH₂—CH₂—OH | CH₃ | " | yellow |
| 89. | " | —CH₂—CH₂—CH₂—O—CH₃ | CH₃ | " | yellow |
| 90. | 4-Methylsulphonylphenyl | —CH₂—CH₂—OH | CH₃ | " | yellow |
| 91. | " | —CH₂—CH₂—O—CH₃ | CH₃ | " | yellow |
| 92. | " | —CH₂—CH₂—CH₂—OH | CH₃ | " | yellow |
| 93. | 4-Methylsulphonylphenyl | —CH₂—CH₂—CH₂—O—CH₃ | CH₃ | " | yellow |
| 94. | " | —CH₂—CH₂—CH₂—O—C₂H₅ | CH₃ | " | yellow |
| 95. | " | —CH₂—CH—CH₃ \| OH | CH₃ | " | yellow |
| 96. | 4-Sulphonamidophenyl | —CH₂—CH₂—OH | CH₃ | " | yellow |
| 97. | 4-Sulphonamidophenyl | —CH₂—CH₂—O—CH₃ | CH₂ | " | yellow |
| 98. | " | —CH₂—CH₂—CH₂—OH | CH₃ | " | yellow |
| 99. | " | —CH₂—CH₂—CH₂—O—CH₃ | CH₃ | " | yellow |
| 100. | " | —CH₂—CH₂—CH₂—O—C₂H₅ | CH₃ | " | yellow |
| 101. | 2,5-Dichloro-4-sulphonamidophenyl | —CH₂—C₆H₅ | CH₃ | " | golden yellow |
| 102. | " | —CH₂—CH₂—OH | CH₃ | " | golden yellow |
| 103. | " | —CH₂—CH₂—O—CH₃ | CH₃ | " | golden yellow |
| 104. | " | —CH₂—CH₂—CH₂—OH | CH₃ | " | golden yellow |
| 105. | " | —CH₂—CH₂—CH₂—O—CH₃ | CH₃ | " | golden yellow |
| 106. | " | —CH₂—CH₂—CH₂—O—C₂H₅ | CH₃ | " | golden yellow |
| 107. | 2,5-Dichloro-4-benzylamino-sulphonylphenyl | —CH₂—CH₂—O—CH₃ | CH₃ | " | golden yellow |
| 108. | 2,5-Dichloro-4-benzylamino-sulphonylphenyl | —CH₂—CH₂—CH₂—O—C₂H₅ | CH₃ | " | golden yellow |
| 109. | 2-Chloro-5-trifluoromethylphenyl | —CH₂—CH₂—OH | CH₃ | " | yellow |
| 110. | " | —CH₂—CH₂—O—CH₃ | CH₃ | " | yellow |
| 111. | " | —CH₂—CH—CH₃ \| OH | CH₃ | " | yellow |
| 112. | " | —CH₂—CH₂—CH₂—OH | CH₃ | " | yellow |
| 113. | " | —CH₂—CH₂—CH₂—O—CH₃ | CH₃ | " | yellow |
| 114. | " | —CH₂—CH₂—CH₂—O—C₂H₅ | CH₃ | " | yellow |
| 115. | 4-Cyclohexyloxycarbonylphenyl | —CH₂—CH₂—OH | CH₃ | " | yellow |
| 116. | " | —CH₂—CH₂—O—CH₃ | CH₃ | " | yellow |
| 117. | " | —CH₂—CH₂—CH₂—OH | CH₃ | " | yellow |
| 118. | " | —CH₂—CH—CH₃ \| OH | CH₃ | " | yellow |
| 119. | " | —CH₂—CH₂—CH₂—O—CH₃ | CH₃ | " | yellow |
| 120. | 2-Nitrophenyl | —CH₂—CH₂—OH | CH₃ | " | scarlet |
| 121. | " | —CH₂—CH₂—O—CH₃ | CH₃ | " | scarlet |
| 122. | " | —CH₂—CH₂—CH₂—O—CH₃ | CH₃ | " | scarlet |
| 123. | 3-Nitrophenyl | —CH₂—CH₂—OH | CH₃ | " | yellow |
| 124. | " | —CH₂—CH₂—CH₂—OH | CH₃ | " | yellow |
| 125. | " | —CH₂—CH₂—O—CH₃ | CH₃ | " | yellow |
| 126. | " | —CH₂—CH—CH₃ \| OH | CH₃ | " | yellow |
| 127. | " | —CH₂—CH₂—CH₂—O—CH₃ | CH₃ | " | yellow |
| 128. | " | —CH₂—CH₂—CH₂—O—C₂H₅ | CH₃ | " | yellow |
| 129. | 4-Nitrophenyl | —CH₂—CH₂—OH | CH₃ | " | scarlet |
| 130. | " | —CH₂—CH₂—O—CH₃ | CH₃ | " | scarlet |
| 131. | " | —CH₂—CH₂—CH₂—OH | CH₃ | " | scarlet |
| 132. | " | —CH₂—CH₂—CH₂—O—CH₃ | CH₃ | " | scarlet |
| 133. | " | —CH₂—CH₂—CH₂—O—C₂H₅ | CH₃ | " | scarlet |
| 134. | 2-Trifluoromethyl-4-chlorophenyl | —CH₂—C₆H₅ | CH₃ | " | yellow |
| 135. | " | —CH₂—CH₂—CH₂—OH | CH₃ | " | yellow |
| 136. | " | —CH₂—CH₂—CH₂—O—CH₃ | CH₃ | " | yellow |
| 137. | 2-Cyano-5-chlorophenyl | —CH₂—CH₂—OH | CH₃ | " | yellow |
| 138. | " | —CH₂—CH₂—O—CH₃ | CH₃ | " | yellow |
| 139. | " | —CH₂—CH₂—CH₂—OH | CH₃ | " | yellow |

-continued

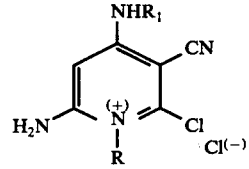

| No. | Diazotized Amine (D—NH₂) D | Coupled with the reaction product of an amine (R₃NH₂) reacted with R₃ | R | R₁ | Colour shade on polyester |
|---|---|---|---|---|---|
| 140. | " | —CH₂—CH(OH)—CH₃ | CH₃ | " | yellow |
| 141. | " | —CH₂—CH₂—CH₂—O—C₂H₅ | CH₃ | " | yellow |
| 142. | 2-Chloro-4-nitrophenyl | —CH₂—CH₂—OH | CH₃ | " | scarlet |
| 143. | " | —CH₂—CH₂—O—CH₃ | CH₃ | " | scarlet |
| 144. | " | —CH₂—CH₂—CH₂—OH | CH₃ | " | scarlet |
| 145. | " | —CH₂—CH₂—CH₂—O—CH₃ | CH₃ | " | scarlet |
| 146. | " | —CH₂—CH₂—CH₂—O—C₂H₅ | CH₃ | " | scarlet |
| 147. | 2-Methoxy-4-nitrophenyl | —CH₂—CH₂—OH | CH₃ | " | red |
| 148. | " | —CH₂—CH₂—O—CH₃ | CH₃ | " | red |
| 149. | " | —CH₂—CH₂—CH₂—OH | CH₃ | " | red |
| 150. | " | —CH₂—CH₂—CH₂—O—CH₃ | CH₃ | " | red |
| 151. | " | —CH₂—CH₂—CH₂—O—C₂H₅ | CH₃ | " | red |
| 152. | 2-Cyano-4-nitrophenyl | —CH₂—CH₂—OH | CH₃ | " | red |
| 153. | " | —CH₂—CH₂—O—CH₃ | CH₃ | " | red |
| 154. | " | —CH₂—CH₂—CH₂—OH | CH₃ | " | red |
| 155. | 2-Cyano-4-nitrophenyl | —CH₂—CH(OH)—CH₃ | CH₃ | " | red |
| 156. | " | —CH₂—CH₂—CH₂—O—CH₃ | CH₃ | " | red |
| 157. | " | —CH₂—CH₂—CH₂—O—C₂H₅ | CH₃ | " | red |
| 158. | 2-Methylsulphonyl-4-nitrophenyl | —CH₂—CH₂—OH | CH₃ | " | red |
| 158. | " | —CH₂—CH₂—O—CH₃ | CH₃ | " | red |
| 159. | " | —CH₂—CH₂—CH₂—OH | CH₃ | " | red |
| 160. | " | —CH₂—CH(OH)—CH₃ | CH₃ | " | red |
| 161. | " | —CH₂—CH₂—CH₂—O—CH₃ | CH₃ | " | red |
| 162. | " | —CH₂—CH₂—CH₂—O—C₂H₅ | CH₃ | " | red |
| 163. | 2,5-Dimethoxy-4-nitrophenyl | —CH₂—CH₂—OH | CH₃ | " | red |
| 164. | " | —CH₂—CH₂—O—CH₃ | CH₃ | " | red |
| 165. | " | —CH₂—CH₂—CH₂—OH | CH₃ | " | red |
| 166. | " | —CH₂—CH₂—CH₂—O—CH₃ | CH₃ | " | red |
| 167. | " | —CH₂—CH₂—CH₂—O—C₂H₅ | CH₃ | " | red |
| 168. | 2,5-Diethoxy-4-nitrophenyl | —CH₂—CH₂—OH | CH₃ | " | red |
| 169. | " | —CH₂—CH₂—O—CH₃ | CH₃ | " | red |
| 170. | 2,5-Diethoxy-4-nitrophenyl | —CH₂—CH₂—CH₂—O—CH₃ | CH₃ | " | red |
| 171. | 2-Carbomethoxy-4-nitrophenyl | —CH₂—CH₂—OH | CH₃ | " | red |
| 172. | " | —CH₂—CH₂—O—CH₃ | CH₃ | " | red |
| 173. | " | —CH₂—CH₂—CH₂—OH | CH₃ | " | red |
| 174. | " | —CH₂—CH₂—CH₂—O—CH₃ | CH₃ | " | red |
| 175. | 6-Methoxybenzthiazolyl-2 | —CH₂—CH₂—OH | CH₃ | " | scarlet |
| 176. | " | —CH₂—CH₂—O—CH₃ | CH₃ | " | scarlet |
| 177. | " | —CH₂—CH₂—CH₂—OH | CH₃ | " | scarlet |
| 178. | " | —CH₂—CH₂—CH₂—O—CH₃ | CH₃ | " | scarlet |
| 179. | 6-Ethoxybenzthiazolyl-2 | —CH₂—CH₂—O—CH₃ | CH₃ | " | scarlet |
| 180. | " | —CH₂—CH₂—CH₂—O—CH₃ | " | " | scarlet |
| 181. | 5,6-Dichlorobenzthiazolyl-2 | —CH₂—CH₂—OH | CH₃ | " | orange |
| 182. | " | —CH₂—CH₂—O—CH₃ | CH₃ | " | orange |
| 183 | " | —CH₂—CH₂—CH₂—OH | CH₃ | " | orange |
| 184. | " | —CH₂—CH₂—CH₂—O—CH₃ | CH₃ | " | orange |
| 185. | " | —CH₂—CH₂—CH₂—O—C₂H₅ | CH₃ | " | orange |
| 186. | 5-Nitro-2,1-benzisothiazolyl-3 | —CH₂—CH₂—OH | CH₃ | " | blue |
| 187. | " | —CH₂—CH₂—O—CH₃ | CH₃ | " | blue |
| 188. | " | —CH₂—CH₂—CH₂—OH | CH₃ | " | blue |
| 189. | " | —CH₂—CH₂—CH₂—O—CH₃ | CH₃ | " | blue |
| 190. | " | —CH₂—CH₂—CH₂—O—C₂H₅ | CH₃ | " | blue |
| 191. | 1,3-Thiazolyl-2 | —CH₂—CH₂—OH | CH₃ | " | orange |
| 192. | " | —CH₂—CH₂—CH₂—O—CH₃ | CH₃ | " | orange |
| 194. | 3-Phenyl-1,2,4-thiadiazolyl-5 | —CH₂—CH₂—OH | CH₃ | " | orange |
| 195. | " | —CH₂—CH₂—O—CH₃ | CH₃ | " | orange |
| 196. | " | —CH₂—CH₂—CH₂—O—CH₃ | CH₃ | " | orange |
| 197. | " | —CH₂—CH₂—CH₂—OH | CH₃ | " | orange |

If instead of the 3-cyanopyridine derivatives corresponding compounds substituted in the 3-position by carbonamide or carboxylic acid ester groups are used as coupling components, corresponding diazo components give dyestuffs which dye polyester materials in similar color and with similar fastness properties.

We claim:
1. A process for preparing an azo dyestuff comprising
a. reacting

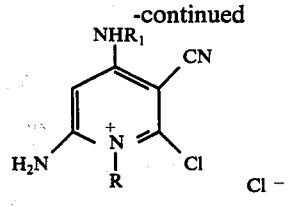

(III)

with at least two equivalents of R₃NH₂ at a temperature of 110° to 130° C to form

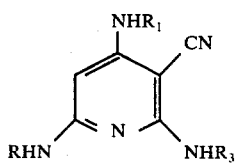 IV b. and then coupling IV, V or VI with diazotized DNH$_2$ wherein

V and VI are prepared by converting IV to

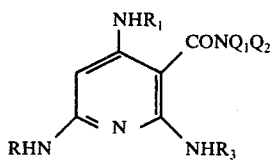 V or

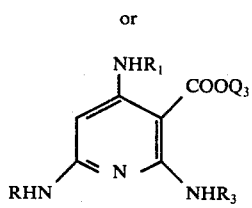 VI by reaction at the cyano group; in which

D is the radical of a diazo component;

R is $C_1$–$C_6$-alkyl; $C_1$–$C_6$-alkyl substituted by halogen, CN, OH, $C_1$–$C_4$-alkoxy or $C_2$–$C_5$-alkoxycarbonyl; cyclohexyl; methyl-cyclohexyl; phenyl; phenyl substituted by $C_1$–$C_4$-alkyl, $C_1$–$C_4$-alkoxy, halogen or cyano; benzyl; phenethyl; or benzyl or phenethyl substituted with chlorine, $C_1$–$C_4$-alkyl or $C_1$–$C_4$-alkoxy;

$R_1$ and $Q_3$ are independently $C_1$–$C_6$-alkyl; $C_1$–$C_6$-alkyl substituted with halogen, cyano, hydroxyl, $C_1$–$C_4$-alkoxy or $C_2$–$C_5$-alkoxycarbonyl; benzyl; phenethyl; benzyl or phenethyl substituted by chlorine, $C_1$–$C_4$-alkyl or $C_1$–$C_4$-alkoxy;

$Q_1$ and $Q_2$ are independently of one another hydrogen, R or conjointly with the nitrogen atom form a morpholine, piperidine or pyrrolidine ring; and $R_3$ is $C_1$–$C_4$-alkyl; $C_1$–$C_4$-alkyl substituted by hydroxy, methoxy or ethoxy; benzyl; phenethyl; benzyl or phenethyl substituted by chlorine, $C_1$–$C_4$-alkyl or $C_1$–$C_4$-alkoxy; phenyl; or phenyl substituted by $C_1$–$C_4$-alkyl, $C_1$–$C_4$-alkoxy, halogen or cyano.

2. Process of claim 1 in which $R_3NH_2$ is a $C_1$–$C_4$-alkylamine; aniline; benzylamine; phenethylamine; γ-hydroxypropylamine, γ-ethoxypropylamine, β-methoxyethylamine or γ-methoxypropylamine.

3. Process of claim 1 in which $R_3NH_2$ is benzylamine.

4. Process of claim 1 in which $R_3$ is benzyl.

5. Process of claim 1 in which said azo dyestuff has the formula

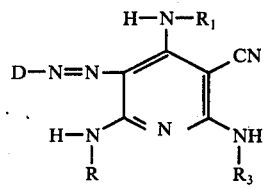

6. The process of claim 1 in which

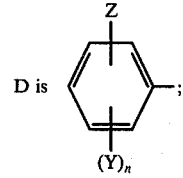

D is

Y is halogen, nitro, cyano, CF$_3$, $C_2$–$C_5$-alkylcarbonylamino, $C_1$–$C_4$-alkylsulphonyl, $C_2$–$C_5$-alkoxycarbonyl, phenyl, $$-SO_2N-V_2 \quad \text{or} \quad -CON-V_2;$$
$$\quad\;\; |\qquad\qquad\qquad\quad |$$
$$\quad\; V_1 \qquad\qquad\qquad\; V_1$$

Z is hydrogen, methyl, $C_1$–$C_4$-alkyl, $C_1$–$C_4$-alkoxy, nitrile or halogen;

$V_1$ and $V_2$ independently of one another are hydrogen or $C_1$–$C_4$-alkyl;

n is the number 1 or 2;

R and $R_1$ are $C_1$–$C_6$-alkyl, or $C_1$–$C_6$-alkyl substituted by OH, CN, halogen, $C_1$–$C_4$-alkoxy or $C_2$–$C_5$-alkylcarbonyl; and $Q_1$ and $Q_2$ are hydrogen or $C_1$–$C_4$-alkyl.

7. Process of claim 1 in which the cyano group is not converted;

D is 4-methylsulphonylphenyl;

R is CH$_3$;

$R_1$ is CH$_3$; and $R_3$ is benzyl.

8. Process of claim 1 in which the cyano group is not converted;

D is 6-methoxybenzthiazolyl-2;

R is CH$_3$; and $R_3$ is benzyl.

9. Process of claim 1 in which the cyano group is not converted;

D is 2,5-dichloro-4-sulphonamidophenyl;

R is CH$_3$;

$R_1$ is CH$_3$; and $R_3$ is —CH$_2$—CH$_2$—CH$_2$OH.

10. Process of claim 1 in which the cyano group is not converted:

D is 2-cyano-4-nitrophenyl;

R is —CH$_3$;

$R_1$ is —CH$_3$; and $R_3$ is —CH$_2$—CH$_2$—CH$_2$—O—C$_2$H$_5$.

11. Process of claim 1 in which the cyano group is not converted;

D is 3-phenyl-1,2,4-thiadiazolyl-5;

R is CH$_3$;

$R_1$ is CH$_3$; and $R_3$ is —CH$_2$—CH$_2$—OH.

* * * * *